(12) United States Patent
Naruse

(10) Patent No.: US 8,708,865 B2
(45) Date of Patent: Apr. 29, 2014

(54) PEDAL APPARATUS FOR ELECTRIC MOTORCAR OR FOR MOTOR VEHICLE HAVING THROTTLE MECHANISM

(76) Inventor: Masuyuki Naruse, Kumamoto (JP)

(*) Notice: Subject to any disclaimer, the term of this patent is extended or adjusted under 35 U.S.C. 154(b) by 581 days.

(21) Appl. No.: 12/939,207

(22) Filed: Nov. 4, 2010

(65) Prior Publication Data
US 2011/0107870 A1    May 12, 2011

(30) Foreign Application Priority Data
Nov. 6, 2009    (JP) .................................. 2009-254869

(51) Int. Cl.
*B60K 26/02*    (2006.01)
*G05G 1/38*    (2008.04)

(52) U.S. Cl.
USPC ........................................... 477/211; 74/512

(58) Field of Classification Search
USPC .................... 74/512–514, 560; 477/209–211, 477/213–215
See application file for complete search history.

(56) References Cited

U.S. PATENT DOCUMENTS

| | | | | | |
|---|---|---|---|---|---|
| 3,641,837 | A | * | 2/1972 | Dean, Jr. .......................... | 74/513 |
| 5,063,811 | A | * | 11/1991 | Smith et al. ..................... | 74/513 |
| 5,293,976 | A | * | 3/1994 | Naruse ........................... | 477/211 |
| 5,507,201 | A | * | 4/1996 | Fairbairn et al. ................ | 74/513 |
| 5,558,601 | A | * | 9/1996 | Naruse ........................... | 477/213 |
| 6,289,762 | B1 | * | 9/2001 | Silva ............................... | 74/513 |
| 6,318,208 | B1 | * | 11/2001 | Thongs et al. .................. | 74/513 |
| 7,181,991 | B2 | | 2/2007 | Naruse | |

FOREIGN PATENT DOCUMENTS

WO    02/097550    12/2002

* cited by examiner

*Primary Examiner* — Thomas Diaz
(74) *Attorney, Agent, or Firm* — Wenderoth, Lind & Ponack, LLP.

(57) ABSTRACT

A pedal apparatus for an electric motorcar or for a motor vehicle having a throttle mechanism, includes: a brake pedal having a brake auxiliary pad to which a brake arm is connected; and an accelerator pad configured to be rotated in the lateral direction within a predetermined angle range for an accelerating operation. The accelerator pad is formed of a reinforced plastic and is formed with a convex-shaped projection at a midsection thereof, a distal end of the accelerator arm extending from a throttle position sensor mounted on a vehicle body and rotating a predetermined angle range is disposed so as to be in abutment with the accelerator pad, and the rotation angle detected by the rotation of the accelerator arm is transmitted to an accelerator or a throttle mechanism that controls a driving motor via the throttle position sensor.

5 Claims, 4 Drawing Sheets

PEDAL APPARATUS FOR ELECTRIC MOTORCAR OR FOR MOTOR VEHICLE HAVING THROTTLE MECHANISM

BACKGROUND OF THE INVENTION

1. Field of the Invention

The present invention relates, for example, to a pedal apparatus for an electric motorcar having a braking operation mechanism and an accelerating operation mechanism or a pedal apparatus for a motor vehicle having a throttle mechanism.

2. Prior Art

In the prior art, as a technology of this type, for example, an accelerator and brake pedal apparatus for a motor vehicle invented by the present inventor is known (International Publication WO02097550). The accelerator and brake pedal apparatus is a brake pedal apparatus including an accelerator mechanism having an auxiliary pedal connected to a brake pedal, which is operated in the vertical direction, an accelerator pad operated in the lateral direction, the accelerator pad being disposed on the auxiliary pedal, the accelerator mechanism being driven using the accelerator pad. The accelerator pad is formed of a panel member with the center portion thereof protruded outward into a convex shape, and the accelerator mechanism is operated using an inclined plane of the convex shape.

The accelerator mechanism at least includes an accelerator lever which receives an operation of the accelerator pad and an accelerator wire arm having an accelerator wire connected thereto, and is configured in such a manner that the accelerator wire arm acts in the direction to pull up or push down the accelerator wire by the operation of the accelerator lever.

In this technology in the prior art described above, even when the brake pedal is depressed with the accelerator in an operating state, the accelerator pad is moved forward together with the auxiliary pedal by the depressing operation consequently, whereby the accelerator lever is restored to its inoperative position immediately when changing the pedal to be depressed to the brake pedal without a moment's delay and the accelerator is turned OFF to allow the brake function to operate normally. Therefore, an erroneous operation is eliminated, and hence occurrence of accidents is prevented.

However, since the accelerator mechanism in the prior art described above is made up of the accelerator lever which receives an operation of the accelerator pad and the accelerator wire arm having the accelerator wire connected thereto, a driver is still required to turn his or her toe outward about his or her heel and move the accelerator pad laterally to turn one end side of the accelerator lever, thereby operating the accelerator wire in the direction of pulling up or pushing down via an accelerator wire arm engaged with the other end side. Therefore, there are problems as follows. The driver is required to operate the accelerator pad by turning his or her toe in the opening direction and the closing direction repeatedly and a wide operating width is required for the accelerator lever to pull up or push down the accelerator wire. Therefore, if the operating width is wide, a force corresponding thereto is needed. Consequently, when driving for a long time, fatigue is accumulated and ultimately fine adjustment of the accelerator becomes difficult.

Therefore, the accelerator and brake pedal apparatus having a configuration to operate the accelerator with the accelerator wire as in the prior art is not suitable practically for electric motorcars or for motor vehicles having a throttle position sensor.

SUMMARY OF THE INVENTION

In view of such problem, it is an object of the invention to reduce the operating width of the accelerator and lighten the load of the operation.

Accordingly, in order to solve the above-described problems, there is provided a pedal apparatus for an electric motorcar or for a motor vehicle having a throttle mechanism according to the invention including: a brake pedal having a brake auxiliary pad to which a brake arm is connected and configured to be depressed for a braking operation; and an accelerator pad configured to be rotated in the lateral direction within a predetermined angle range for an accelerating operation, wherein the accelerator pad is formed of a reinforced plastic and is formed with a convex-shaped projection at a midsection thereof, a distal end of the accelerator arm extending from a throttle position sensor mounted on a vehicle body and rotating a predetermined angle range is disposed so as to be in abutment with the accelerator pad, and the rotation angle detected by the rotation of the accelerator arm is transmitted via transmitting means to an accelerator or a throttle mechanism that controls a driving motor via the throttle position sensor.

Preferably, the brake pedal is formed with a depression or a projection to allow a heel of footwear of a driver to engage. Preferably, the accelerator arm is provided with a rotatable roller at a distal end portion thereof, which comes into abutment with the accelerator pad. In addition, preferably, the transmission means is an electric signal.

The pedal apparatus according to the invention includes the accelerator pad provided on the brake pedal and formed of a reinforced plastic and formed with the convex-shaped projection at the midsection thereof, and the throttle position sensor mounted on the side of the vehicle body, and is configured in such a manner that the distal end of the accelerator arm extended from the throttle position sensor is disposed in abutment with the accelerator pad, and the accelerator arm is operated via the accelerator pad by turning the toe portion of the foot placed on the brake pedal in the directions to open and close about the heel thereof, thereby controlling the accelerator or the driving motor via the throttle position sensor. Therefore, the accelerating operation of the electric motorcar can easily be performed. Simultaneously, when an attempt is made to suddenly apply the-brake in the accelerator operating position, the accelerator is turned OFF by depressing the brake pedal as-is by instinct. Therefore, time lag or erroneous depression that may occur when changing the depression of the pedal from the accelerator to the brake is avoided, so that an accurate braking operation is achieved. Accordingly, superior safety is effectively achieved.

Also, since the accelerating operation is performed via the electric signal using the throttle position sensor, the load of operation is alleviated, and hence the operation can be performed lightly. Therefore, the driver is relieved from accumulation of fatigue and can drive for a long time without load. Furthermore, by forming at least the accelerator pad of a reinforced plastic, the weight of the entire pedal is reduced and, in addition, volume production can easily be performed using a molding device. Consequently, cost reduction is effectively achieved.

DETAILED DESCRIPTION OF THE PREFERRED EMBODIMENTS

Figure 1:
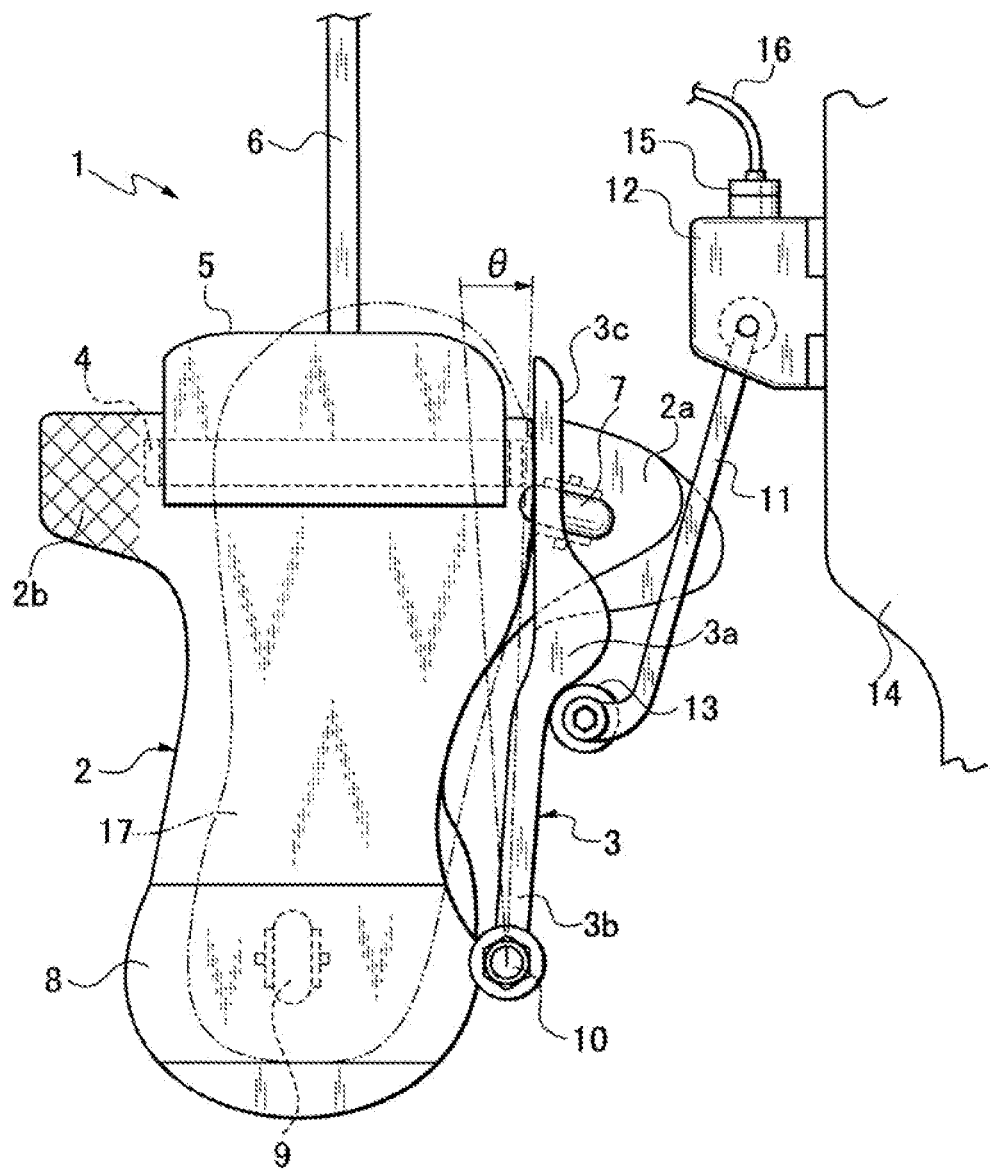
FIG. 1 is a plan view showing a pedal apparatus according to an embodiment of the invention.

Referring now to the drawings, a pedal apparatus according to the invention will be described in detail.

As shown in FIG. 1, a pedal apparatus 1 includes a brake pedal 2 configured to be depressed to effect a braking operation and an accelerator pad 3 configured to be rotated laterally within a predetermined angle range to effect an accelerating operation like the brake pedal apparatus in the prior art described above.

The brake pedal 2 is formed of metal, and is formed with protruding portions 2a and 2b having a predetermined width on both sides of a distal end portion (toe side) thereof. A metallic brake auxiliary pad 5 is mounted to a substantially midsection of the brake pedal 2 so as to be capable of rotating via a shaft portion 4. A brake arm 6 is connected to the brake auxiliary pad 5 and, although not shown in the drawing, for example, a predetermined brake mechanism including a hydraulic power unit or the like having a general structure is connected to the brake arm 6. When the brake auxiliary pad 5 is depressed together with the brake pedal 2, the operation of the brake mechanism via the brake arm 6 is achieved. The brake pedal 2 may be formed of a colored reinforced plastic for the purpose of weight reduction. The brake auxiliary pad 5 is provided with a rubber sheet for avoiding slippage bonded on an upper surface thereof.

A lateral slide roller 7 is provided on the right protruding portion 2a of the brake pedal 2. The lateral slide roller 7 alleviates friction generated when a driver turns a distal end of a shoe placed on the brake auxiliary pad 5 in the lateral direction for operating the accelerator pad 3, and allows smooth operation of the accelerator pad 3.

A depression 8 for allowing fitting of part of a shoe heel is formed on a rear end side (heel side) of the brake pedal 2, and a roller 9 is formed on the backside so as to project therefrom. The roller 9 serves as a rotation center of the brake pedal 2 and also moves forward when the brake pedal 2 is depressed to allow a slow-down operation of the accelerator to be preformed smoothly at the same time as the braking operation. The depression 8 is configured to hold the heel of a footwear (shoe) of the driver (prevent the shoe from slipping) and ensure the operation of the brake pedal 2 during the operation. The roller 9 may be rotated on a floor of the motor vehicle, but preferably configured to be guided by a guide member 18 or the like mounted on the floor for ensuring the smooth rotation.

The accelerator pad 3 is rotatably (rotation in a substantially fan-shape) mounted on the right side of an upper surface on the rear end side of the brake pedal 2 via a shaft portion 10, and is substantially disposed along a side surface of the brake pedal 2.

Figure 2:
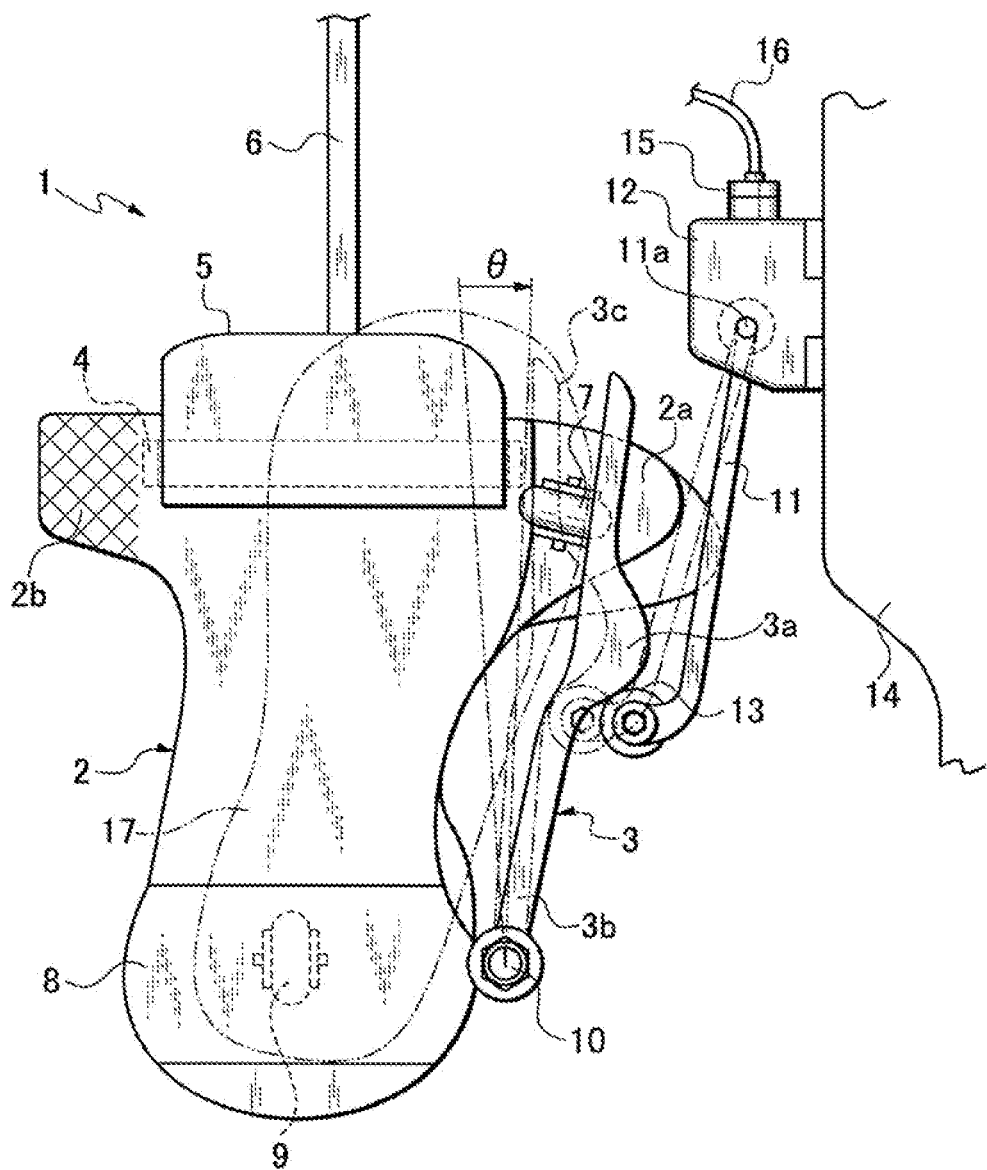
FIG. 2 is a plan view showing a state in which an accelerator arm is pushed rightward by operating an accelerator pad of the pedal apparatus.

The accelerator pad 3 has a shape of a panel having a predetermined width and is formed of a colored reinforced plastic for the purpose of weight reduction. A substantially midsection of the accelerator pad 3 is protruded outward to form a convex projection 3a, and an end portion (proximal end portion) 3b on the bearing side and an end portion (distal end portion) 3c on the free end side are maintained to have a substantially flat panel shape. The convex shape that constitutes the projection 3a preferably has a curved shape, and as shown in FIGS. 1 and 2, the junctions of the end portions 3b and 3c with the convex projection 3a are concave curves, respectively, that are concave in a lateral direction facing away from the brake pedal 2, such that inflection points are respectively defined between the convex projection 3a and the concave curves.

The position to mount the accelerator pad 3 is the right side of the upper surface on the rear end side of the brake pedal 2 when the braking operation is done by the right foot. If it is easier for the user to operate the brake by the left foot, it can be mounted on the left side, that is, it can be mounted on either the left or the right side. The mounted accelerator pad 3 has play in a range of rotation angle θ (θ=3 to 5°) in a fan-shape.

An accelerator arm 11 is disposed on the side of the accelerator pad 3 so as to come into contact with an outer side surface thereof. The accelerator arm 11 is mounted at a proximal side thereof to a throttle position sensor 12 via an accelerator arm shaft 11a, and is configured to rotate in a predetermined angle range. A roller 13 is mounted at a distal end portion of the accelerator arm 11, and the roller 13 comes into contact with the accelerator pad 3. The rotation angle range of the accelerator arm 11 is determined so as to prevent the roller 13 from rotating leftward beyond the position of contact with the accelerator pad 3 (position shown in the drawing).

The throttle position sensor 12 is mounted at a suitable position in a cabin, for example, on a vehicle body 14, a vehicle wall, a separate mounting member or the like, and includes in an interior thereof a circuit having electronic components mounted thereon. The throttle position sensor 12 is configured to adjust, for example, the number of revolutions of an engine (driving motor) or an accelerator mechanism (clutch) electrically on the basis of the rotation angle position of the accelerator arm 11, and is electrically connected to a throttle mechanism (including the accelerator mechanism) via a cord 16 with a plug 15. Reference numeral 17 indicated by an imaginary line in the drawing designates a driver's footwear (shoe).

The operation of the pedal apparatus 1 according to the invention configured as described above will be described. First of all, a positional relationship shown in FIG. 1 is an inoperative position of the accelerator and the brake, in which respective mechanisms such as the brake auxiliary pad 5 and the accelerator pad 3 including the accelerator arm 11 are urged so as to be always at the inoperative position.

Figure 3:
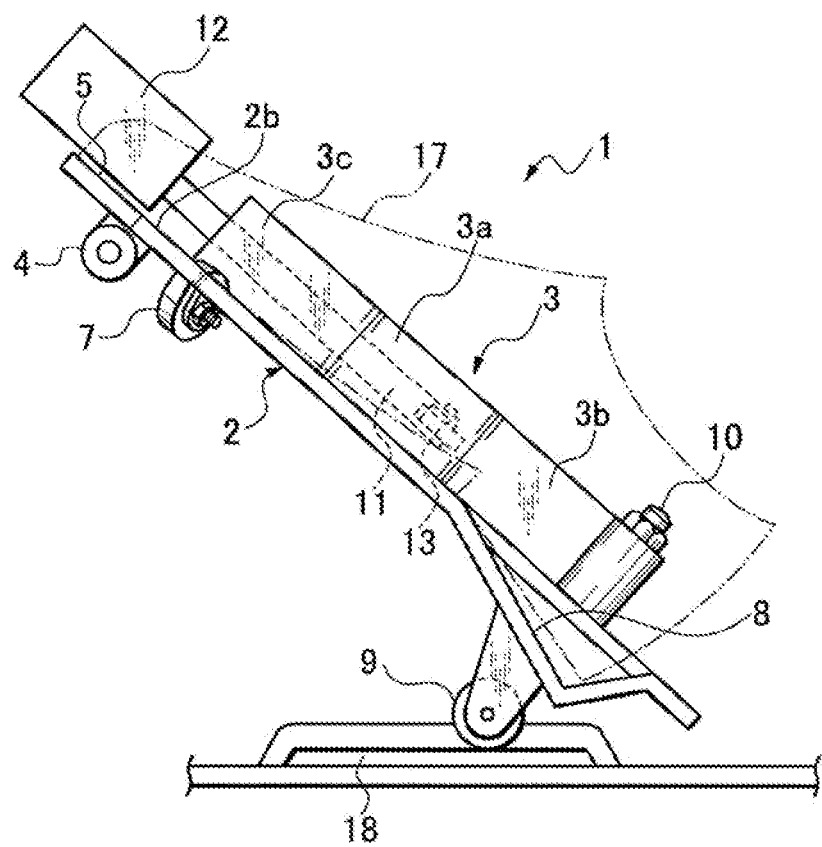
FIG. 3 is a left side view showing the pedal apparatus.

In this state, as shown in FIGS. 2 and 3, when the right foot of the driver, that is, the footwear such as the shoe 17 is lightly placed on the brake pedal 2 and the brake auxiliary pad 5 and, in the state in which the engine is driven, the toe side is turned or moved rightward about the heel of the shoe 17, the distal end portion 3c of the accelerator pad 3 is pushed and hence the accelerator pad 3 rotates rightward about the shaft portion 10 toward an operative position. Accordingly, the roller 13 mounted on the accelerator arm 11 rotates along an inclined plane of the convex shape of the projection 3a toward the apex thereof and the accelerator arm 11 is pushed and moved rightward and is rotated counterclockwise about the accelerator arm shaft 11a. The rotation angle position or the range of rotation of the accelerator arm 11 is transmitted to the throttle mechanism via predetermined transmitting means, for example, via electrically detected electric signals. The throttle mechanism adjusts the number of revolutions of the driving motor or the operating state of the accelerator mechanism to achieve the travel at a predetermined speed.

In this case, the more the accelerator arm 11 is moved rightward by being pushed by the accelerator pad 3, the higher the number of revolutions of the driving motor or the operating state of the accelerator mechanism are increased and, accordingly, the traveling speed of the motor vehicle is increased. Since the accelerator pad 3 has a convex shape, even when it is rotated slightly rightward, the roller 13 of the accelerator arm 11 moves significantly, and hence the rotation angle of the accelerator arm 11 is increased correspondingly. In this manner, the traveling speed of the motor vehicle can be selected arbitrarily by adjusting the operating state of the accelerator arbitrarily on the basis of the turning movement of the toe side of the driver.

During the normal traveling of the motor vehicle, for example, when the motor vehicle is about to enter an intersection and hence the speed is to be reduced by applying the brake, the driver turns the toe leftward little by little to restore the accelerator pad 3 toward its original position. Then, the roller 13 of the accelerator arm 11 rotates along the inclined plane of the convex shape of the projection 3a toward a bottom portion (trough portion), and the accelerator arm 11 is returned leftward. Accordingly, the drive of the accelerator or the output of the driving motor is lowered, and hence the traveling speed is gradually lowered. Finally, by turning OFF the accelerator or the driving motor and depressing the brake auxiliary pad 5 together with the brake pedal 2, the motor vehicle can be stopped while adjusting the speed.

Figure 4:
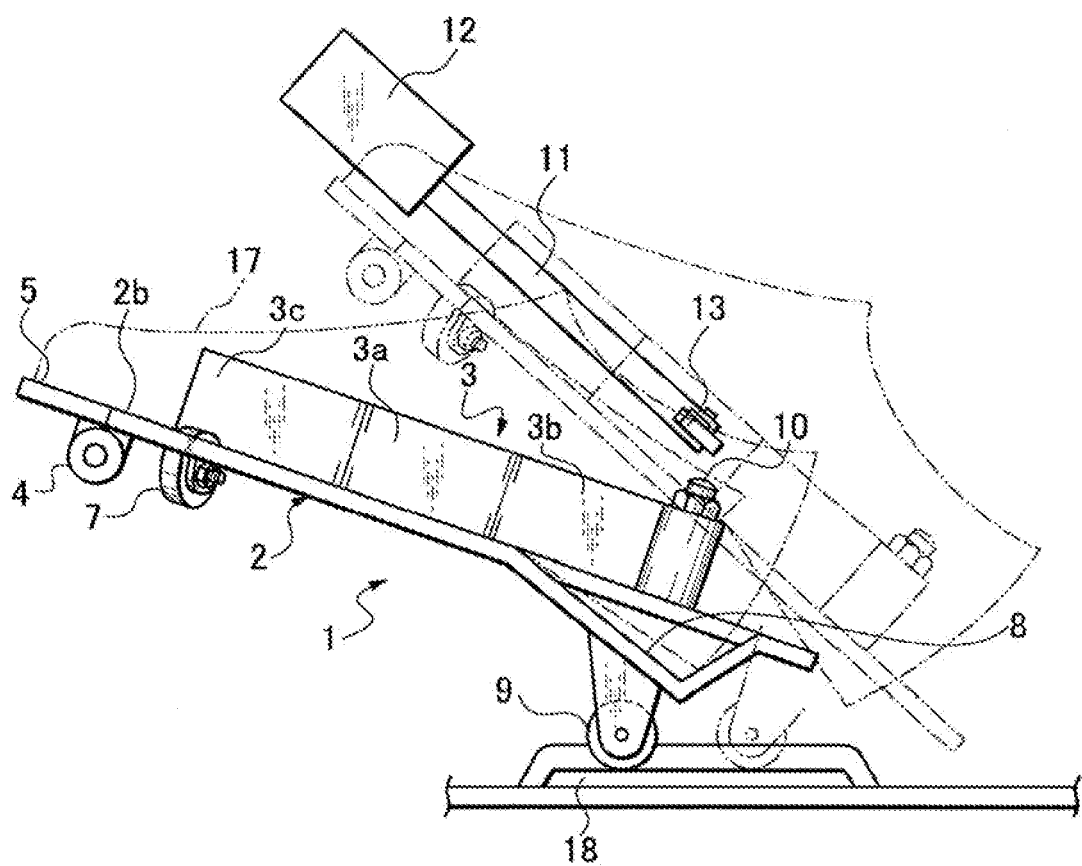
FIG. 4 is a side view showing the pedal apparatus in a state of braking suddenly from a normal traveling state.

The driving is performed as described above in the normal state. However, in the case where sudden braking is needed for example, by depressing the brake auxiliary pad 5 quickly with the brake pedal 2 as-is without turning OFF the accelerator or the driving motor by returning the accelerator pad 3, as shown in FIG. 4, the brake pedal 2 is moved forward with the roller 9, and the distal end side is lowered about the roller 9 as a supporting point. Therefore, the distal end of the accelerator arm 11, that is, the roller 13 is separated from the accelerator pad 3 simultaneously with the depression of the brake, and the accelerator arm 11 is restored to its original position immediately. The operation of the accelerator or the driving motor is completely turned OFF. The braking operation and the turning OFF of the accelerator are performed simultaneously, and hence double safety is achieved.

In this manner, when suddenly applying the brake, the accelerator and the driving motor are brought into the OFF state simultaneously only by depressing the brake pedal 2 on which the foot is placed and the brake auxiliary pad 5 to the deepest position without returning the accelerator pad 3. Therefore, the braking operation is ensured without a moment's delay that may occur when moving the foot from the accelerator to the brake or an erroneous operation such as depressing the accelerator instead of the break is eliminated. Therefore, the accelerator is turned OFF simultaneously with the braking operation by an instinctive operation of the driver, and hence the safety is ensured.

The pedal apparatus according to the invention is configured in such a manner that the accelerator pad having a convex-shaped projection is mounted on the right side surface or the left side surface of the brake pedal so as to be capable of rotating in the fan shape, and a roller at the distal end portion of the accelerator arm extending from the throttle position sensor is disposed so as to be in contact with the accelerator pad. The driver controls the traveling speed of the motor vehicle by operating the accelerator arm by pushing out the accelerator pad in the lateral direction so as to open the toe side of the foot (shoe) placed on the brake pedal outward or returning back the same so as to close. Even when the sudden braking is applied during the control, depressing the accelerator erroneously instead of the brake is prevented by the vertical operation to depress the brake pedal and, in addition, the accelerator arm is moved away from the accelerator pad and hence the accelerator is turned OFF by depressing the brake pedal. Therefore, an accurate and quick braking operation is achieved, and hence the invention can be applied widely to various types of motor vehicles.

Also, by forming at least the accelerator pad of a reinforced plastic, a reduced-weight pedal apparatus can be manufactured with ease by molding and weight reduction. Therefore, volume production is possible, and hence, wide ranges of applications are expected.

What is claimed is:

1. A pedal apparatus configuration for an electric motorcar or for a motor vehicle having a throttle mechanism, comprising:
   a brake pedal having a brake auxiliary pad to which a brake arm is connected and configured to be depressed for a braking operation;
   an accelerator pad configured to be rotated in a lateral direction, substantially perpendicular to a direction in which the brake pedal is to be depressed, within a predetermined angle range for an accelerating operation, the accelerator pad being formed of a reinforced plastic and having a laterally-projecting convex-shaped projection at a midsection thereof;
   a throttle position sensor mounted on a wall of a body of the motor vehicle in a position laterally offset from said brake pedal; and
   an accelerator arm rotatably mounted to said throttle position sensor and extending therefrom so as to be rotatable in the lateral direction through a predetermined angle range and such that a distal end of the accelerator arm is in abutment with the accelerator pad;
   wherein a rotation angle detected by rotation of the accelerator arm is transmitted via an electrical signal to an accelerator or the throttle mechanism that controls a driving motor via said throttle position sensor;
   wherein said accelerator pad has a proximal end portion rotatably mounted at a rear end of said brake pedal, and a distal end portion laterally movable toward and away from a front end of said brake pedal;
   wherein said laterally-projecting convex-shaped projection is located at the midsection of said accelerator pad between said proximal end portion of said accelerator pad and said distal end portion of said accelerator pad, said convex-shaped projection being convex in a lateral direction facing away from said brake pedal;
   wherein said proximal end portion of said accelerator pad has a substantially flat panel shape;
   wherein said distal end portion of said accelerator pad has a substantially flat panel shape;
   wherein said accelerator pad is shaped with a first concave curve at a junction of said proximal end portion and said laterally-projecting convex-shaped projection, said first concave curve being concave in the lateral direction facing away from said brake pedal, such that a first inflection point is defined between said laterally-projecting convex-shaped projection and said first concave curve; and
   wherein said accelerator pad is shaped with a second concave curve at a junction of said distal end portion and said laterally-projecting convex-shaped projection, said second concave curve being concave in the lateral direction facing away from said brake pedal, such that a second inflection point is defined between said laterally-projecting convex-shaped projection and said second concave curve.

2. The pedal apparatus configuration according to claim 1, wherein the brake pedal is formed, at a rear end thereof, with a depression configured to receive a heel of footwear of a driver to prevent slippage thereof from the brake pedal.

3. The pedal apparatus configuration according to claim 1, wherein the accelerator arm is provided with a rotatable roller at a distal end portion thereof, which comes into abutment with the accelerator pad.

4. The pedal apparatus configuration according to claim 1, wherein
   said accelerator pad has a first surface facing in the lateral direction toward said brake pedal and a second surface facing in the lateral direction away from said brake pedal and, when viewed in the direction in which the brake pedal is to be depressed, said first surface is shaped differently than said second surface.

5. The pedal apparatus configuration according to claim 1, wherein the brake pedal, the brake auxiliary pad, the accelerator pad, and the accelerator arm are arranged and configured in such a manner that, upon sudden braking by depressing the brake auxiliary pad with the brake pedal, the distal end of the accelerator arm is separated from the accelerator pad simultaneously with depression of the brake pedal with the brake auxiliary pad, so as to turn off the accelerator or throttle mechanism.

\* \* \* \* \*